(12) United States Patent  (10) Patent No.: US 8,523,261 B2
Hübner et al.  (45) Date of Patent: Sep. 3, 2013

(54) SIDE WALL COVER (76) Inventors: Reinhard Hübner, Kassel (DE);
Hermann Benkhoff, Duderstadt (DE);
Marcus Dietrich, Calden (DE); Werner Ratz, Homberg (DE)

( * ) Notice: Subject to any disclaimer, the term of this patent is extended or adjusted under 35 U.S.C. 154(b) by 111 days.

(21) Appl. No.: 13/156,393

(22) Filed: Jun. 9, 2011

(65) Prior Publication Data

US 2011/0304170 A1  Dec. 15, 2011

(30) Foreign Application Priority Data

Jun. 9, 2010 (EP) .................................. EP10005937
Jun. 28, 2010 (EP) .................................. EP10006667
Oct. 22, 2010 (DE) ..................... 20 2010 014 610 U (51) Int. Cl.
*B62D 33/10* (2006.01)
*B61D 17/20* (2006.01)

(52) U.S. Cl.
USPC ........................................... 296/39.1; 296/98

(58) Field of Classification Search
USPC .................... 296/98, 37.8, 37.16; 105/8.1, 3, 105/458, 15–19; 280/403, 467
See application file for complete search history.

(56) References Cited

U.S. PATENT DOCUMENTS

| 4,781,123 | A  | * | 11/1988 | Yoshihara ...................... 105/8.1 |
| 5,515,791 | A  | * | 5/1996  | Britzke et al. .................. 105/8.1 |
| 6,966,591 | B2 | * | 11/2005 | Schlecht ..................... 296/37.16 |
| 7,140,659 | B2 | * | 11/2006 | Walter et al. ................ 296/37.16 |
| 7,240,944 | B2 | * | 7/2007  | Plettrichs et al. .......... 296/37.16 |
| 7,537,257 | B2 | * | 5/2009  | Watanabe et al. .......... 296/24.46 |
| 7,581,773 | B2 | * | 9/2009  | Strasser et al. .............. 296/1.09 |

FOREIGN PATENT DOCUMENTS

| DE | 3639898 A1 | 6/1988 |
| DE | 20 2009 004 538 U1 | 7/2009 |
| EP | 0625459 A1 | 11/1994 |

* cited by examiner

*Primary Examiner* — Glenn Dayoan
*Assistant Examiner* — Sunsurraye Westbrook
(74) *Attorney, Agent, or Firm* — Gifford, Krass, Sprinkle, Anderson & Citkowski, P.C.

(57) ABSTRACT

The subject of the invention is a wall cover on the inner side of a bellows of a transfer between two pivotably interconnected vehicles, wherein the side wall cover is held by two holding devices, wherein each holding device is arranged at the body of a vehicle and wherein the holding device receives the side wall cover to be able to be rolled up when the length of the side wall cover shortens during travel around a curve.

25 Claims, 7 Drawing Sheets

SIDE WALL COVER

CROSS-REFERENCE TO RELATED APPLICATIONS

This application claims priority of European Patent Application EP 10 005 9377 filed Jun. 9, 2010, European Patent Application EP 10 006 667.9 filed Jun. 28, 2010 and German Utility Model DE 20 2010 014 619.0 filed Oct. 22, 2010.

FIELD OF THE INVENTION

The invention relates to a side wall cover on the inner side of a bellows of a transfer between two pivotably interconnected vehicles, wherein the side wall cover is held by two holding devices and wherein each holding device is arranged at the body of a vehicle.

BACKGROUND OF THE INVENTION

An inner wall lining of a transfer in the form of a side wall cover is required in order to protect the bellows from destruction by passengers, i.e. such a side wall cover in the form of an inner wall lining serves as protection against vandalism. In addition, however, such a side wall cover also has the function of visually enhancing the transfer as such and, in particular, by the fact that the bellows, which is part of the transfer, is at least covered at the sides.

A transfer with an inner lining is known from, for example, DE A 3639898. The inner lining known from this specification is distinguished by one inner and two outer lining elements, wherein the inner lining element displaces relative to the outer lining elements when the train travels around a curve. Such a construction is complicated and also expensive.

A side wall cover of the kind stated in the introduction is known from EP 0625459 A1. This side wall cover is in detail distinguished by the fact the side wall cover is formed as a plate which is intrinsically elastically yielding and constructed to be curved about the upright axis in the direction of the centre of the transfer. The mounting for reception of the side wall cover is in detail distinguished by two mutually spaced-apart spring hinges which are arranged at the respective bodies and which are connected with a partly circular, roller-shaped element, wherein a resilient element of elastomer is arranged on the roller-shaped element and ultimately connected with the side wall cover. In this regard a steel cable is provided, which draws together the two ends of the side wall cover and in this way produces a pre-arching of the side wall cover in direction towards the inner side of the transfer. It is ensured by this pre-arching that during travel around a curve, i.e. when kinking of the vehicle occurs, the side wall in fact bulges into the interior of the transfer. It is disadvantageous in this regard that due to the biasing of the side wall cover in direction towards the interior of the vehicle the clear passage width is reduced. A further reduction in the clear passage width then occurs when the articulated vehicle travels through a curve and the side wall cover disposed on the inner side of the curve bulges even further into the interior of the passage.

SUMMARY OF THE INVENTION

The object underlying the invention consequently consists in providing a side wall cover of the kind stated in the introduction, in which, particularly during travel around a curve, a further reduction in the clear passage width of the transfer does not occur.

For fulfillment of the object it is proposed in accordance with the invention that the holding device receives the side wall cover to be able to be rolled up when the length of the side wall shortens during travel around a curve. If in this connection consideration is again given to the prior art according to the already cited EP 0625459 A1, then it is evident therefrom that during travel around a curve the side wall cover on the curve inner side unwinds from the drum-shaped body, wherein by contrast thereto it is provided in the invention that the holding device receives the side wall cover to be able to be rolled up. This means that it is ensured by the capability of being rolled up that the side wall cover no longer arches out towards the interior of the transfer, but rather the excess of side wall cover arising at the inner side during travel around a curve is taken up by the rolling movement of the holding device.

Advantageous features and embodiments with respect to the invention are evident from the subclaims.

Thus, it is provided, in particular, that the holding device comprises an axle which holds a roll body receivable by the axle to be rotatable relative to the axle. The roll body itself serves for reception of the side wall cover. In this connection it is provided that the roll body is constructed in the manner of a tube shell and is held by the axle to extend parallel to the axle. In order to ensure that the side wall cover can be rolled up or also wound up by the roll body as is required during travel around a curve when the side wall on the curve inner side is shortened in longitudinal direction provision is made for the roll body to be rotatably connected with the axle by at least one spiral or leg spring. This means that the roll body is biased by the at least one spiral or leg spring in such a manner that when the side wall is relieved of load, i.e. in the case of shortening of the side wall, the side wall is wound up by the roll body by virtue of the spring force.

The side wall cover is advantageously clampably fastened to the roll body. It is thereby achieved that the side wall capable of being rolled up is not weakened by any drillings or other intrusions into the structure of the side wall. This is of particular interest when the side wall cover comprises a strengthening means in the form of, for example, a glass-fibre fabric saturated with synthetic resin.

It has already been mentioned that the roll body is loaded by a spiral or leg spring in such a manner that the side wall cover is held under bias by the spring force of the spiral or leg spring, with the object of winding up the side wall cover on the roll body during travel around a curve and corresponding unwinding on the opposite side. In connection with the arrangement of the springs it is provided in accordance with a further feature of the invention that the roll body has at each end two discs which are arranged at a spacing in the width of the spiral spring and between which the spiral spring is mounted, wherein the leg or spiral spring is articulated by one end thereof to the axle and by the other end thereof to the roll body. The connection of the axle with the roll body takes place by the discs arranged at both ends of the axle.

It is known that in the case of pivotably interconnected vehicles the transfer connecting the two vehicles is subject to the most diverse forms of movement. Thus, the transfer has to be in a position of being able to accommodate bending, pitching and rolling movements or superimposed forms of movement between rolling, pitching and bending movements. Particularly in the case of pitch movements it will be the case that the pivotably interconnected vehicles also have an offset in height relative to one another. In order to make such an offset in height possible, according to a further feature of the invention it is proposed that the side wall cover is fastened to the body at least by one holding device to be displaceable in longitudinal direction. It is evident therefrom that the side wall cover can jump in height such as is required when, for example, a vehicle travels through a dip or over a brow.

In this connection it has already been mentioned that the holding device comprises an axle, wherein at least one arm for connection with the body is arranged at the axle. In this regard the arm has an eye for displaceable mounting of the axle so as to make possible even a longitudinal displacement of the side wall cover in the case of an offset in height of the vehicles relative to one another.

In order to now ensure that the side wall cover can return to its initial position, according to a further feature of the invention it is provided that the axle is mounted by the at least one arm to be displaceable against the force of at least one spring. At another point reference was already made to the fact that the roll body has at both ends two discs for connection with the axle, wherein arranged between the two discs is a spiral or leg spring which on the one hand ensures that the side wall cover is biased, but on the other hand also ensures that in the case of shortening of the side wall cover the side wall cover rolls up on the roll body of the holder. This takes place due to the fact this spiral or leg spring is articulated on the one hand to the axle and on the other hand to the roll body. The strength of the spiral or leg spring and thus the stress acting on the side wall are of such a magnitude that even lateral forces beyond 50 kg, for example due to persons who are leaning, can be accepted. Similarly, it has already been mentioned that the side wall cover should be in a position of being able to accommodate a height offset of the vehicle, for example in the case of pitch movements. In this connection, reference was similarly also made to the fact that the axle is held by at least one arm to be displaceable against the force of at least a spring. In this regard, it is in detail further provided with advantage that the mutually facing discs on the axle each serve as an abutment for a compression spring, wherein the respective compression spring bears at the other end against the respective arm by which the holding device is fastened to the body. It is clear therefrom that the axle is displaceable relative to the two arms, by which the axle is fastened to the respective body, in both directions against the force of the respective spring. This means that it is ensured by the springs that the axle in every case always adopts its initial setting, thus the side wall cover on each occasion always returns to its initial setting.

An another point reference was already made to the fact that the roll body is constructed as a tube shell. In this connection, according to a further feature of the invention the arm for fastening the holding device to the body is constructed to be cranked so as to enable rotational movement of the roll body about the axle. This means that the amount of rotation is to that extent dependent on the degree of cranking of the arm and on the opening angle which the tube shell has, i.e. by how many degrees the tube shell is opened, thus how large the window in the tube shell is.

In the afore-described form of embodiment it is thus the case that the rotational angle for rolling up the side wall cover is substantially limited by the fact that the arms, which mount the holding device at the body, are arranged in the roll body constructed as tube shell.

The subject of the invention is now a variant, wherein the axle projects at least one end, preferably at both ends, beyond the roll body and wherein this projecting axle section comprises a spring, particularly a compression spring, wherein the compression spring is supported on the one hand at an arm and on the other hand at the disc of the roll body. It is advantageous with this design that the rotational angle of the roll body is not restricted, thus the side wall cover can also be wound up on the roll body through 360° or more.

As already explained at another point, the most diverse forms of movement occur in an articulated vehicle. These are pitching, rolling and bending movements. Bending movements arise particularly when the vehicle travels over a brow or through a dip. It is immediately understandable that the side wall cover in the region of its upper side or its lower side, depending on respectively whether there is travel over a brow or through a dip, is tensioned. If at one side, for example a lower side, the side wall cover is pulled, then it is also pressed on the other, opposite side, for example upper side. In order to now prevent movements or force loadings of that kind in the long term from leading damage of the side wall cover, according to a special feature of the invention it is provided that the arm is elastically flexible in axial direction of the arm, in particular mounted on the body to be resiliently yielding. As already mentioned at another point, the arm serves for fastening the holding device to the body of the vehicle. Through a mounting, which is in particular elastically resilient, of the arm in axial direction of the arm at the body it is achieved that tension loads in the upper region of the side wall cover or compression loads, which arise in correspondence therewith, on the lower side of the side wall cover, such as occur in the case of pitching movements, can be absorbed by the resilient mounting of the arm in axial direction with respect to the arm at the body. In detail it is provided with respect thereto that the arm is mounted to be displaceable in a pocket, wherein the pocket has at least one spring. The side wall cover has a holding device on each side. At each end of the side wall cover the holding device is connected by way of least two arms with the respective body. Each of these arms is, as already mentioned, mounted on the body to be elastically yielding, for example in that the arm is guided to be movable in a pocket, wherein the pocket has at least one spring which, particularly in the case of loading of the side wall cover in compression, has the consequence that the arm enters into the respective pocket at the body against the spring arranged therein. If, thereagainst, the side wall cover in the installed state is loaded in tension in the upper or lower region, then this similarly takes place against the force of the spring arranged in the pocket in that the spring is, in particular, loaded in tension. However, it is also conceivable to allow the spring to be effective only in compression, wherein it is thereby ensured that the two holding devices are centred by the resiliently arranged arms disposed on each side.

According to a further feature it is provided, particularly in connection with absorption of pitching and rolling movements, that the holding device is arranged at the body to be pivotable about a horizontal axle. It is thereby possible to provide compensation for, in particular, pitching movements.

It is advantageous if the arrangement of the holding device is undertaken at a pivot strip, wherein the pivot strip is pivotably mounted on a horizontal axle at the body. If this pivot strip is elastically resiliently yielding in the direction of the horizontal axle, thus, for example is constructed as a plate spring, then rolling movements and also superimposed rolling and pitching movements can be transmitted to a substantial extent. An articulation, which is undertaken in such a manner, of the holding device to the body relieves the side wall cover, which can be rolled up, of load when pitching and rolling movements occur.

It has already been mentioned that the side wall cover is constructed as, especially, a glass-fibre fabric saturated with synthetic resin. In this regard it is additionally provided to use phenol, epoxide, polyester or polyurethane resin as synthetic resin. In order to construct the side wall cover to be flameresistant, ammonium polyphosphate is admixed with the synthetic resin as a flame retardant. The elasticity of a side wall cover of such construction is such that it can be wound up or rolled up on the roll body.

BRIEF DESCRIPTION OF THE DRAWINGS

The invention is explained in the following by way of example on the basis of drawings.

In said drawings.

DETAILED DESCRIPTION OF THE PREFERRED EMBODIMENTS

Figure 1:
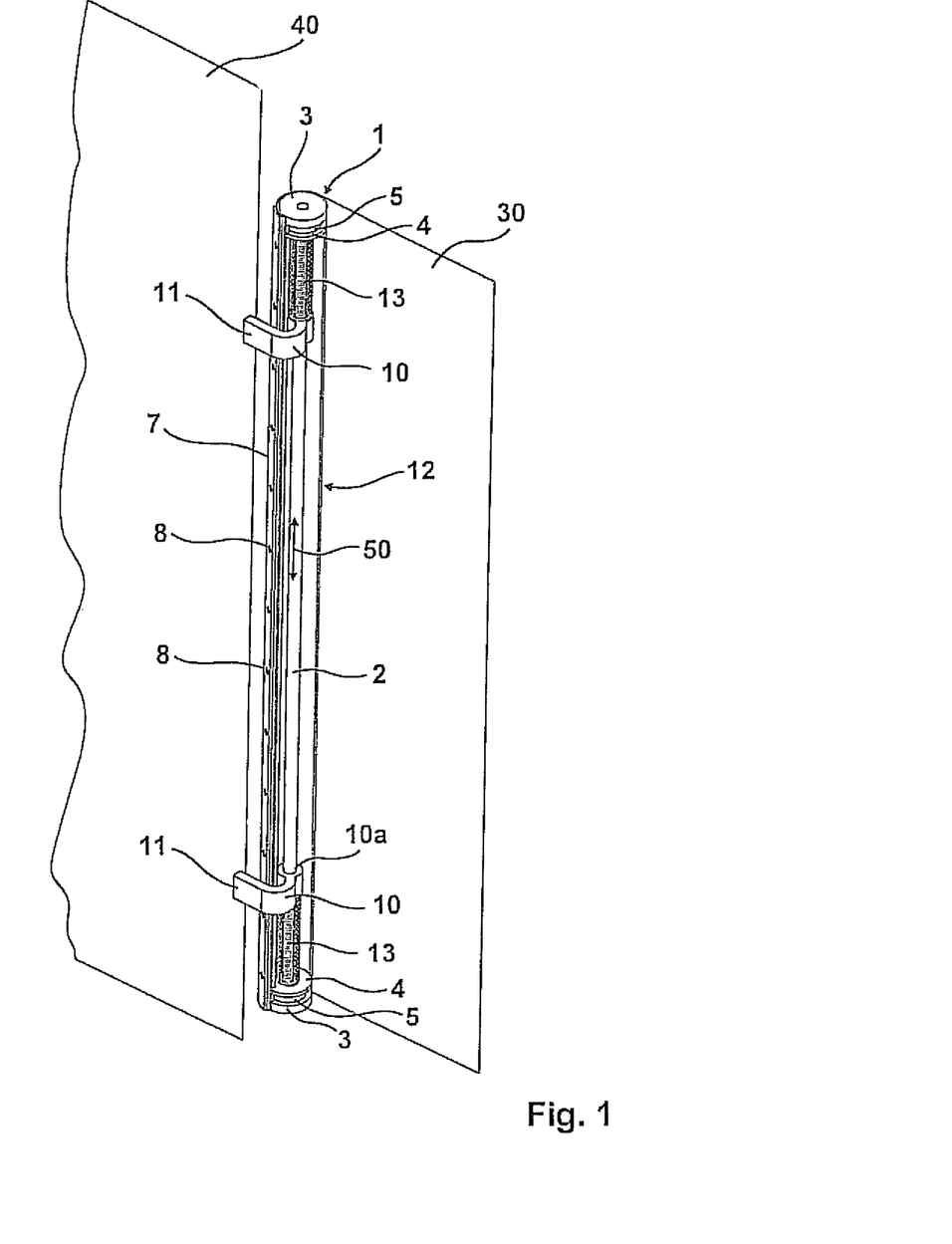
FIG. 1 shows the side wall cover according to the invention with a holding device in a perspective view, wherein the body to which the holding device is fastened is merely indicated.
Figure 2:
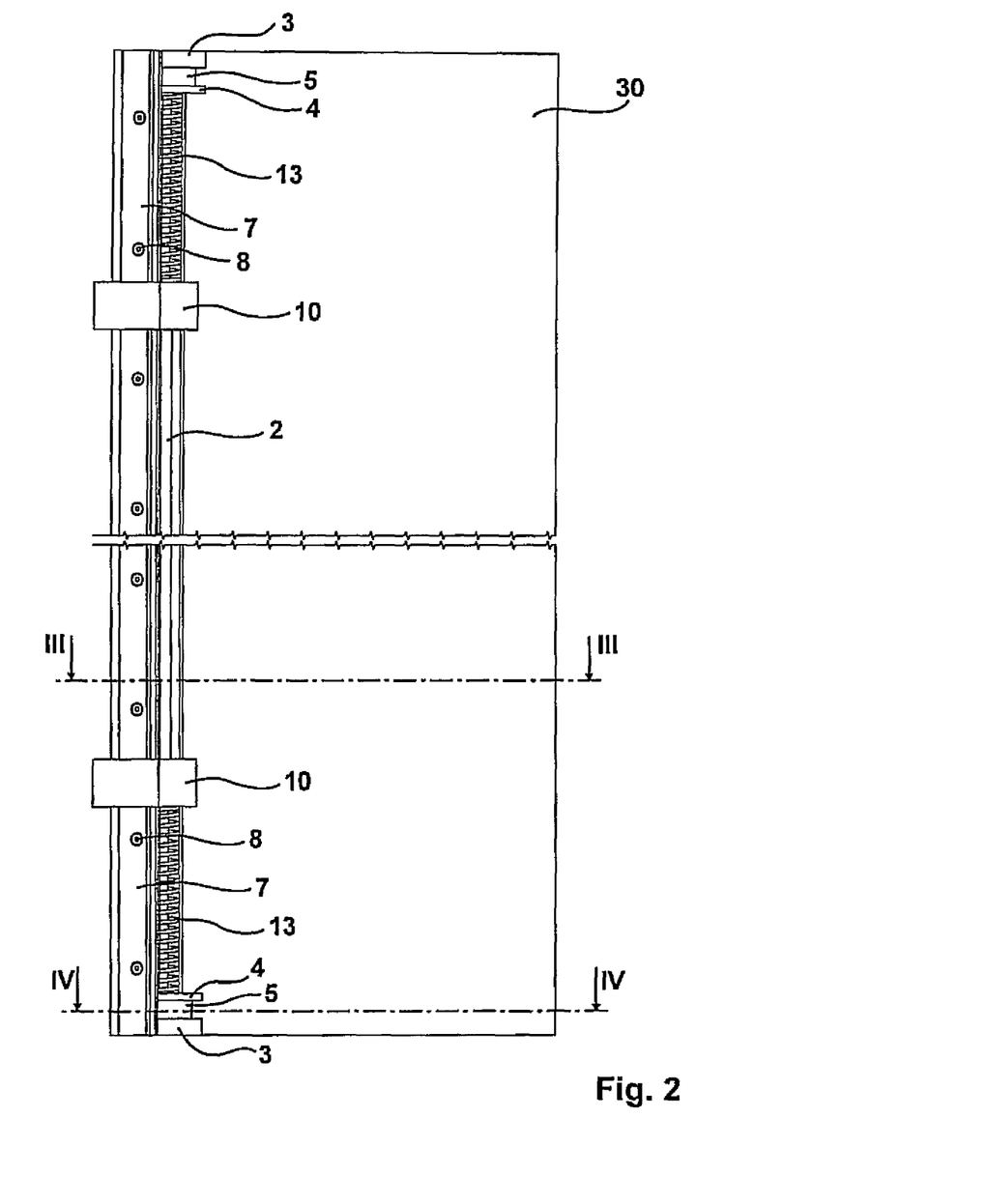
FIG. 2 shows the side wall cover according to FIG. 1 in a side view.

The mounting, which is denoted overall by 1, can be seen from the illustration according to FIG. 1, wherein the mounting receives the side wall cover denoted overall by 30. The side wall cover 30 represents a highly elastic plate which is receivable by the mounting, which is denoted by 1, to be able to be wound up.

For this purpose the mounting 1 is constructed as follows: The mounting 1 comprises the axle 2, wherein the axle 2 has at each end two discs 3, 4 which are arranged at a spacing from one another and between which the spiral or leg spring 5 is mounted, as evident in detail from FIG. 4. In this connection the leg or spiral spring 5 is connected at one end with the axle 2 and at the other end with the roll body 6, which is constructed in the manner of a tube shell as is evident in the view of FIG. 3 and also of FIG. 4. The roll body 6 is connected by the discs 3, 4, or at least by one of the discs 3, 4, with the axle 2, in particular to be secure against relative rotation.

Figure 3:
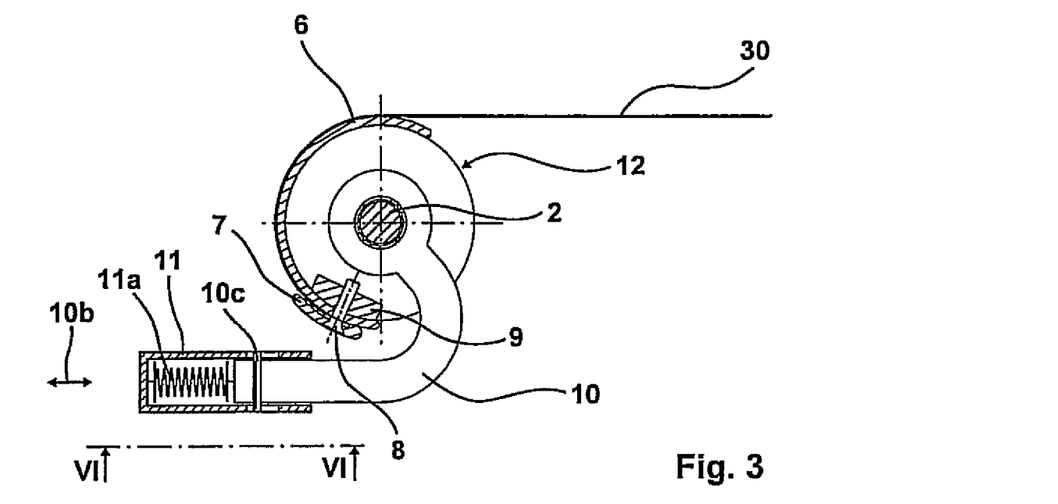
FIG. 3 shows a section according to the line of FIG. 2.
Figure 4:
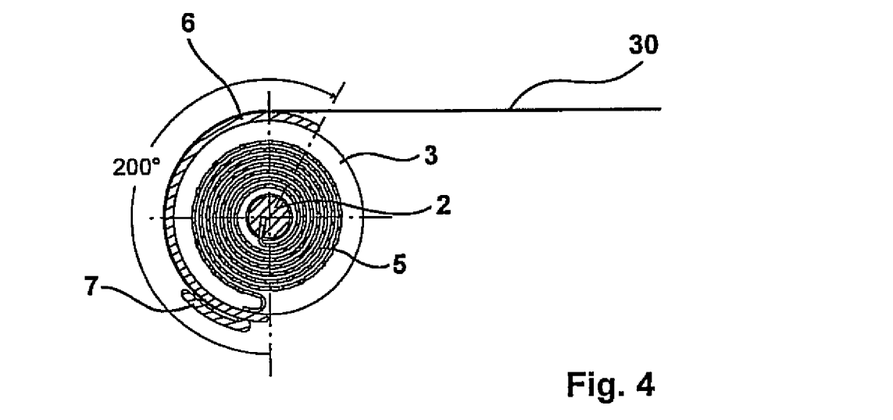
FIG. 4 shows a section according to the line IV-IV of FIG. 2.

The side wall cover 30 is fastened to the roll body 6 in clamped manner. Provided for the clampable reception of the side wall cover 30 is the clamping strip which is denoted by 7 and which is fastened by screws 9 to the roll body 6 in such a manner that a threaded strip 9 into which the screws 8 engage, as is evident in the depiction of FIG. 3, is provided on the inner side of the roll body 6. The roll body 6 has, as tube shell, an encircling angle of approximately 200° so that a window-like opening 12 with a width of 160° results. In addition, arranged at the axle 2 at a spacing from one another are the two arms 10 which are constructed to be strongly cranked as is evident particularly also in the view of FIG. 3. The cranking is in this regard selected in such a manner that the arm 10 is led directly out of the window-like opening 12 in the roll body 6 and is connected with the body, which is indicated by 40, by, for example, screws (not illustrated). Disposed on both sides of the arms 10—which, as already mentioned, are arranged at a spacing from one another and displaceably on the axle 2—is a respective compression spring 13 which is supported at one end on the arm 10 and at the other end on discs 3 functioning as an abutment. It is clear therefrom that in the case of an offset in height of the pivotably interconnected vehicles the axle 2 can displace along the double arrow 50 relative to the arms 10, wherein the arms 10 each have an eye 10a for displaceable reception of the axle 2. The axle 2 is also rotatably mounted in the eye 10a. The axle is held by the discs 3, 4, which are constructed as abutments and at which the compression spring 13 arranged between the arms 10 and respective discs 3, 4 is supported (FIG. 1). It is evident therefrom that the side wall cover 30 is held at the body 40 by the arms 10 in conjunction with the axle 2 and the compression springs 13, wherein the compression spring is mounted between the respective arm 10 and the disc 4 functioning as an abutment. A further disc 3 is disposed at the end on the axle 2, wherein the spiral spring 5 is arranged between the disc 3 and the disc 4. The connection of the axle 2 with the roll body 6 is effected by at least one of the discs 3, 4, wherein disposed between the discs 3, 4 is the spiral spring 5 which serves for winding up the side wall cover 30.

Figure 5:
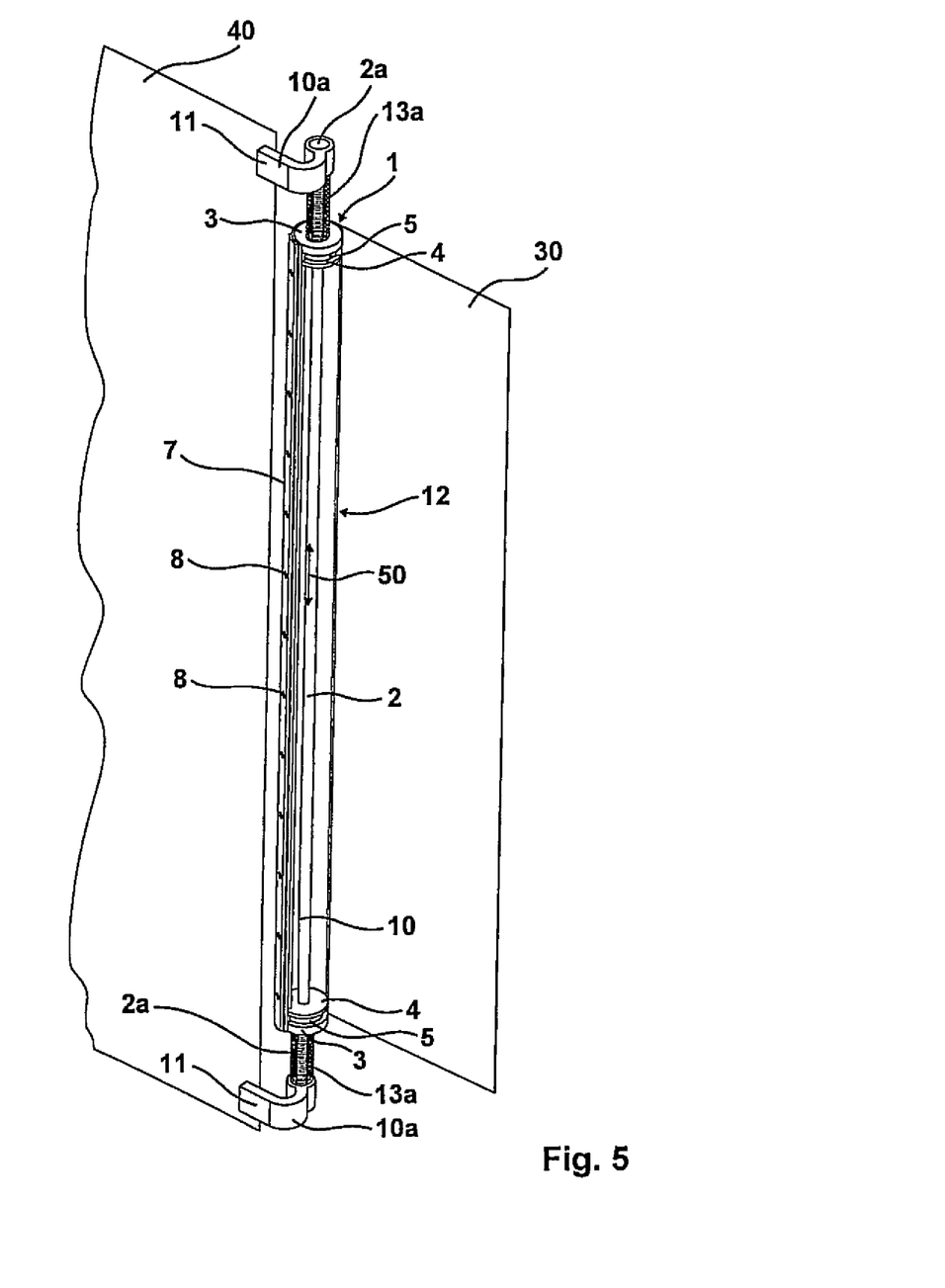
FIG. 5 shows a modified form of embodiment with respect to FIG. 1.

In the case of the illustration according to FIG. 5 the axle 2 projects beyond the roll body 6 at both ends. The thereby-arising projecting axle section 2a receives a respective compression spring 13a which is supported at one end on the disc 3 and at the other end on the arm 10, which is arranged at the end of the axle section. The arm 10 serves for fastening the holding device to the respective body.

The advantage of this variant consists in that the roll body can rotate as desired about its own axis, wherein this takes place in dependence on the biasing force applied by the spring 5.

In another form of embodiment in which the two arms are articulated to the axle 2 in the roll body constructed as a tube shell, the rotational angle is restricted. A 'greater' pull-out of the side wall cover is possible only by an increase in the diameter of the roll body.

Figure 6:
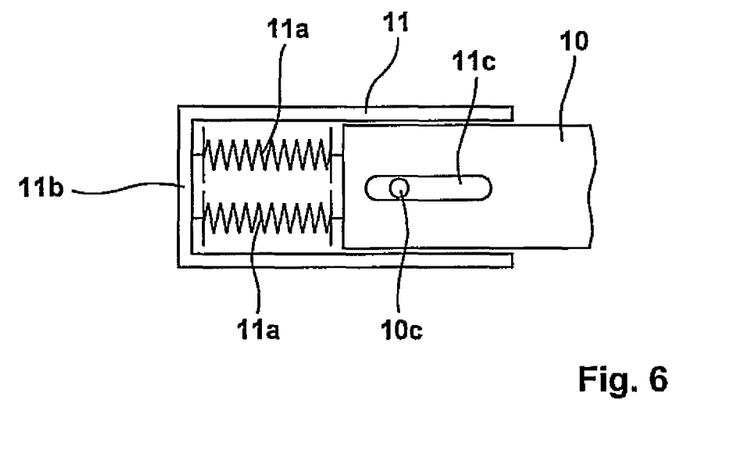
FIG. 6 shows a view according to the line VI-VI of FIG. 3, wherein the view is illustrated in section.

As evident from the illustration according to FIG. 3 and FIG. 6, the arm 10 is mounted in a pocket 11 to be elastically yielding, against the force of a spring 11a, in axial direction of the arm (arrow 10b). The pocket 11 is of approximately rectangular construction, as is also apparent in the view of FIG. 6. To that extent two springs 11a arranged parallel to one another are disposed in the pocket 11, wherein the two springs 11a are fastened on the one hand to the end face of the arm 10 and in a given case also to the base 11b of the pocket 11. The connections can be effected by screws. In order to confine the movability of the arm 10 in the pocket 11, a slot 11c in which a pin 10c—which is fastened to the arm 10—engages is arranged in the pocket 11.

Figure 7:
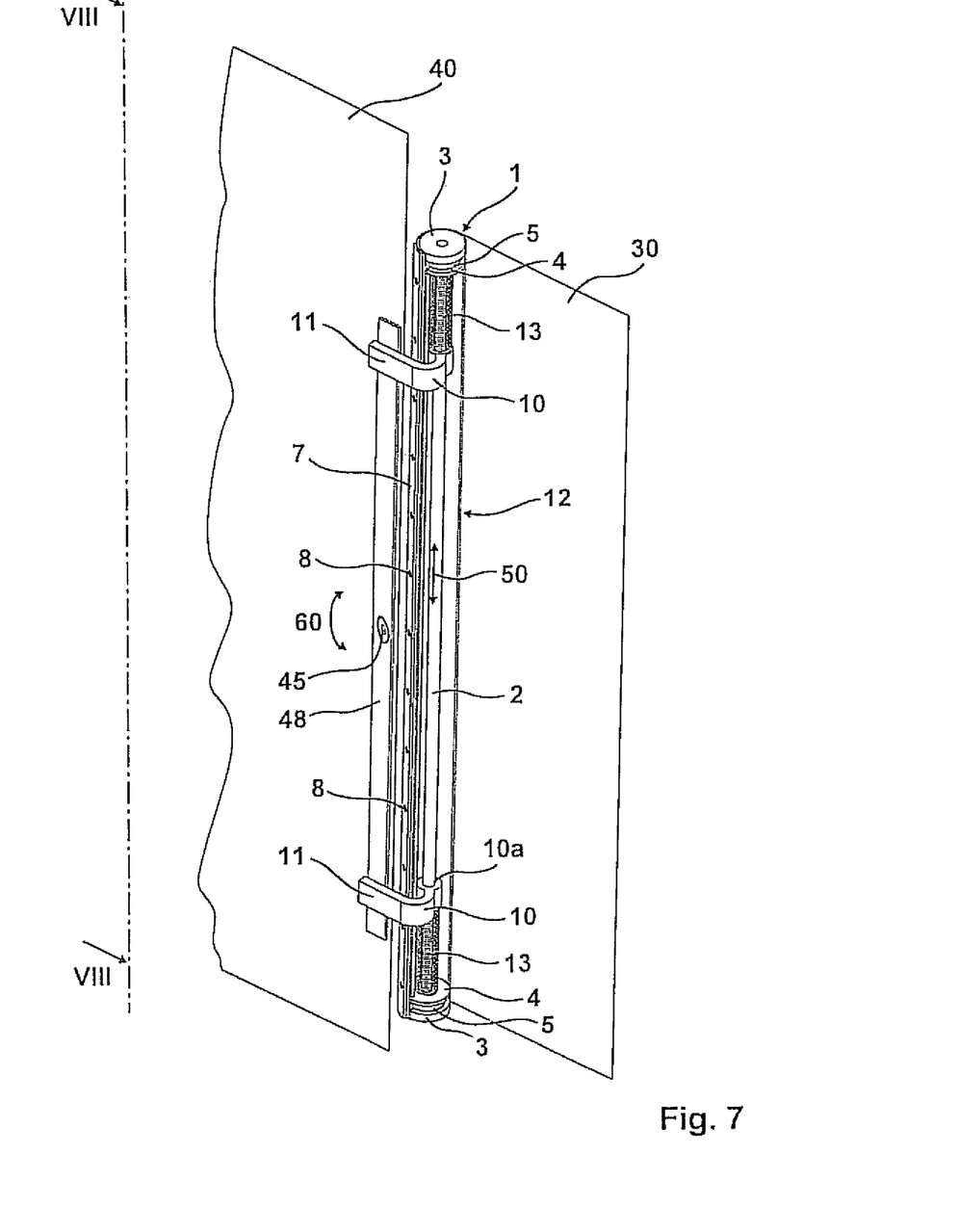
FIG. 7 shows a construction according to FIG. 1, wherein, however, the holding device is pivotably arranged at the body.
Figure 8:
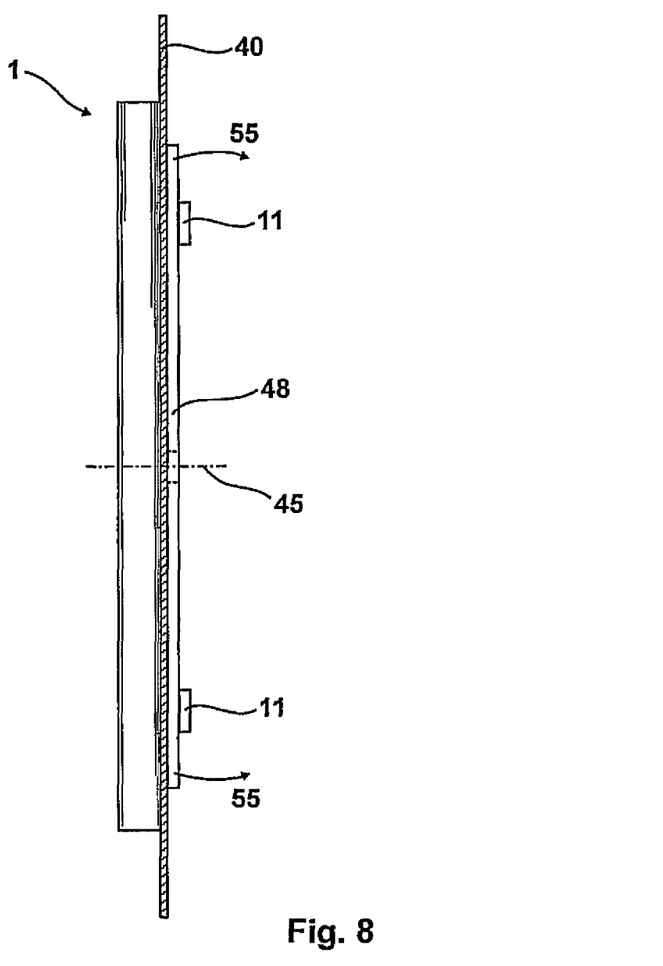
FIG. 8 shows a view according to the line VIII-VIII of FIG. 7.

The arrangement, which is pivotable about the horizontal axle 45, of the holding device 1 in correspondence with the arrow 60 can be seen in the illustration according to FIG. 7 and FIG. 8.

The pockets 11 are mounted on the pivot strip 48, which is pivotably fastened to the body 40 by the axle 45. The arrangement of the holding device can, however, also be effected directly to the pivot strip 48 in direct manner by the arrangement of the arms 10.

The pivot strip is constructed to be resiliently movable out of its plane, which means that it is in a position to yield not only to pitching movements, but also offsetting or rolling movements, such as occur when articulated vehicles travel through, for example, an S bend. The spring direction is denoted by the arrow 55.

The invention claimed is:

1. A wall cover assembly for the inner side of a bellows of a transfer between two pivotably interconnected vehicle, the wall cover assembly comprising:
a side wall cover;
a first and a second holding device each disposed at the body of a vehicle;
a side wall cover interconnected with the holding devices;
wherein the side wall cover is rolled up on the holding devices when the length of the side wall cover is shortened during travel around a curve.

2. A wall cover assembly according to claim 1, wherein the holding device includes an axle.

3. A wall cover assembly according to claim 2, wherein the holding device further includes a roll body supported on the axle to be rotatable relative to the axle.

4. A wall cover assembly according to claim 3, wherein the roll body is constructed as a tube shell and is received on the axle to be displaceable parallel to the axle.

5. A wall cover assembly according to claim 3, wherein the side wall cover is clamped to the roll body.

6. A wall cover assembly according to claim 3, wherein the axle has two ends that project beyond the roll body to define projecting axle sections, wherein each projecting axle section receives a spring.

7. A wall cover assembly according to claim 6, wherein the at least one arm is arranged at one of the ends of the axle section.

8. A wall cover assembly according to claim 2, wherein the holding device further includes at least one arm for connection with the body.

9. A wall cover assembly according to claim 8, wherein the arm has an eye displaceably received on the axle.

10. A wall cover assembly according to claim 8, wherein the holding device further includes at least one spring and the axle is displaceable against the force of the at least one spring.

11. A wall cover assembly according to claim 8, wherein the at least one arm is constructed to be cranked so as to enable rotational movement of the roll body about the axle.

12. A wall cover assembly according to claim 8, wherein the axle projects at at least one end beyond the roll body, wherein a projecting portion of the axle has a spring which bears at one end against the at least one arm of the holding device.

13. A wall cover assembly according to claim 8, wherein the at least one arm is elastically yielding in an axial direction of the arm.

14. A wall cover assembly according to claim 13, wherein the at least one arm is displaceably mounted in a pocket arranged at the vehicle body, wherein the pocket has at least one spring.

15. A wall cover assembly according to claim 14, wherein the relative movability of the arm in the pocket is limited.

16. A wall cover assembly according to claim 14, wherein the arms or the pockets for reception of the arms are arranged at a pivot strip which is pivotably articulated to the body by the axle.

17. A wall cover assembly according to claim 16, wherein the pivot strip is of resilient construction.

18. A wall cover assembly according to claim 1, wherein at least one of the holding devices is fastened to the body and is displaceable in a longitudinal direction of the holding device.

19. A wall cover assembly according to claim 1, wherein the side wall cover is held under bias between the holding devices.

20. A wall cover assembly according to claim 1, wherein the holding device is mounted on the body to be pivotable about a horizontal axle.

21. A wall cover assembly for the inner side of a bellows of a transfer between two pivotably interconnected vehicle, the wall cover assembly comprising:
a side wall cover;
a first and a second holding device each disposed at the body of a vehicle, each holding device including an axle, a roll body rotatably supported on the axle, and at least one spring rotatably interconnecting the axle and spring;
a side wall cover interconnected with the holding devices;
wherein the side wall cover is rolled up on the holding devices when the length of the side wall cover is shortened during travel around a curve.

22. A wall cover assembly according to claim 21, wherein:
the roll body includes at least two discs;
the at least one spring is mounted on the axle between the discs; and
the at least one spring has one end articulated to the axle and has an other end articulated to the roll body.

23. A wall cover assembly according to claim 22, wherein the axle is connected with the roll body by at least one of the discs.

24. A wall cover assembly according to claim 22, wherein:
the at least one spring includes two compression springs;
the at least two discs include inner discs arranged at each end of the axle, the inner discs each serving as an abutment for the one of the compression springs; and
further comprising an arm connecting the holding device to the body, one of the compression springs bearing against the arm.

25. A wall cover assembly for the inner side of a bellows of a transfer between two pivotably interconnected vehicle, the wall cover assembly comprising:
a resilient side wall cover;
a first and a second holding device each disposed at the body of a vehicle, each holding device having a rotatable roll body;
a side wall cover interconnected with roll bodies of the holding devices;
wherein the side wall cover is rolled up about the roll bodies of the holding devices when the length of the side wall cover is shortened during travel around a curve.

* * * * *